(No Model.)
W. L. VOELKER.
PROCESS OF AND MATERIAL FOR MANUFACTURING HOODS FOR INCANDESCENT GAS LIGHTS.
No. 566,040. Patented Aug. 18, 1896.
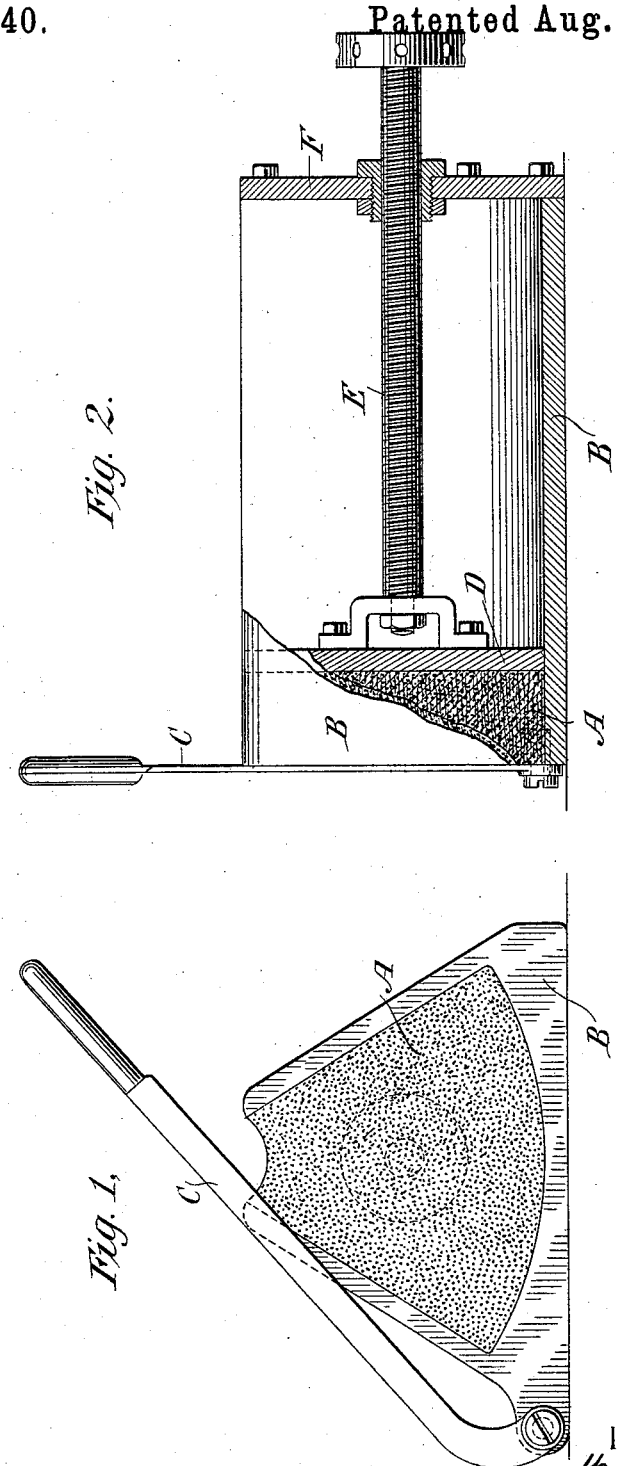
WITNESSES:
C. E. Ashley
I. W. Lloyd
INVENTOR:
William L. Voelker
By his Attorney
D. Walter Brown

UNITED STATES PATENT OFFICE.

WILLIAM L. VOELKER, OF ELIZABETH, NEW JERSEY, ASSIGNOR, BY MESNE ASSIGNMENTS, TO THE CONSOLIDATED STERLING INCANDESCENT GAS LAMP COMPANY, OF NEW JERSEY.

PROCESS OF AND MATERIAL FOR MANUFACTURING HOODS FOR INCANDESCENT GAS-LIGHTS.

SPECIFICATION forming part of Letters Patent No. 566,040, dated August 18, 1896.

Application filed October 14, 1895. Serial No. 565,684. (No specimens.)

*To all whom it may concern:*

Be it known that I, WILLIAM L. VOELKER, a citizen of the United States, and a resident of the city of Elizabeth, Union county, State of New Jersey, have invented certain new and useful Improvements in Processes of and Materials for Manufacturing Hoods or Mantles for Incandescent Gas-Lights, of which the following is a specification.

This invention relates to the process of and materials for manufacturing hoods or mantles for incandescent gas-lights. In particular, it relates to hoods that are produced from the material to which I have given the name of "celluoxid."

In another application for Letters Patent, which is now pending in the United States Patent Office, I have described the manner of making this so-called "celluoxid," and will here only mention that its basis is camphor, gun-cotton, and one or more of the oxids of the metals of the alkaline earths, such as lime and magnesia or earths proper. In my other application I have also described the use of this material for making mantles by rolling it into sheets, perforating the same, and then forming cones of such perforated sheets, to be used as incandescent hoods or mantles. In the present case, however, I dispense with mechanical perforations and proceed in the following manner, referring to the drawings which accompany the specification to aid in the description, and wherein—

Figure 1 is an end elevation of the case and knife for cutting the films, and Fig. 2 is a longitudinal elevation of the same with one side removed to show the movable hood and micrometer-screw.

The celluoxid produced as described in my other aforesaid application is rolled into thin sheets and cut to a suitable size. One such sheet is then laid on a flat surface, and on said sheet is placed a number of parallel strands of cotton thread, twine, wooden fibers, or any other suitable combustible fibers. Another sheet of celluoxid and then another layer of combustible fibers are laid on, and so on alternately until the desired thickness is reached. The mass is then subjected to many tons pressure until the whole has been consolidated into a hard body. The surfaces of the said body, which are perpendicular to the threads or fibers, are then cut to the form of a blank that is suitable for making a cone, as is clearly indicated in Fig. 1. The body A thus shaped is then placed in a metal case B, which has the shape of the blank. To one end is pivoted a sharp knife-blade C, that works up and down past the open end of the case, as indicated in the drawings. At the other end of the case B there is provided a movable head D, E being a micrometer-screw working in a nut in a yoke F. With the knife C sheets of about one one-thousandth of an inch in thickness may be cut from the aforesaid body, which is pushed forward as required by the micrometer-screw E. The films or shavings thus cut from the body A, and each of course having the outline of the flat side of the body, and being suitable for the manufacture of the hood, are wrapped around a metal blank which is the shape of the hood, and the slightly-overlapping edges are cemented together by moistening them with oil of cassia. The hood is then placed in a mold and subjected to pressure, after which it is ready to bake. After baking the hood is ready to give light, and may be placed on a Bunsen burner in the usual manner. In the process of baking the pieces of cotton, wood, or other combustible fiber are burned out, leaving a great number of small holes in the walls of the hood, in which the gas burns.

While I prefer to incorporate the combustible fibers with celluoxid, I may also incorporate them with any other porcelainizing material while such material is in the plastic condition.

Now, having described my improvement, I claim as my invention—

1. The process hereinbefore described of manufacturing hoods or mantles for incandescent gas-lights, consisting in combining with the celluoxid combustible fibers, then cutting films from the mass at right angles with such fibers, then forming the films into the shape of hoods, and then baking in order to burn out the combustible fibers.

2. A material for hoods or mantles of incandescent gas-lights consisting of layers of celluoxid and combustible fibers, substantially as described.

3. The process of manufacturing material for hoods or mantles of incandescent gas-lights, consisting in incorporating combustible fibers with a mass of porcelainizing material, cutting films from the mass at right angles to said fibers, and burning out the fibers, substantially as described.

In testimony that I claim the foregoing as my invention I have signed my name, in presence of two witnesses, this 9th day of August, 1895.

WILLIAM L. VOELKER.

Witnesses:
HENRY V. BROWN,
BERNARD J. ISECKE.